United States Patent [19]

Hashimoto

[11] Patent Number: 5,758,757
[45] Date of Patent: Jun. 2, 1998

[54] WIRE RING RETAINING COLLAR AND RELEASE DEVICE FOR A PULL TYPE CLUTCH MECHANISM

[75] Inventor: Yasuyuki Hashimoto, Neyagawa, Japan

[73] Assignee: Exedy Corporation, Osaka, Japan

[21] Appl. No.: 767,405

[22] Filed: Dec. 16, 1996

[30] Foreign Application Priority Data

Jul. 17, 1996 [JP] Japan .................. 8-187499

[51] Int. Cl.⁶ .................................. F16D 23/14
[52] U.S. Cl. .............. 192/89.24; 192/98; 192/DIG. 1
[58] Field of Search ............... 192/89.24, 70.13, 192/70.27, 98, DIG. 1, 110 B

[56] References Cited

U.S. PATENT DOCUMENTS

| | | | |
|---|---|---|---|
| 4,702,362 | 10/1987 | Banks et al. | 192/98 |
| 4,967,891 | 11/1990 | Takeuchi | 192/98 |
| 5,201,393 | 4/1993 | Takeuchi et al. | 192/70.13 |
| 5,318,162 | 6/1994 | Maucher et al. | 192/89.24 X |

FOREIGN PATENT DOCUMENTS

| | | |
|---|---|---|
| 4-31335 | 3/1992 | Japan . |
| 4-84927 | 7/1992 | Japan . |
| 4-107525 | 9/1992 | Japan . |
| 4-122825 | 11/1992 | Japan . |

*Primary Examiner*—Richard M. Lorence
*Attorney, Agent, or Firm*—Shinjyu An Intellectual Property Firm

[57] ABSTRACT

In a release device of a pull type clutch, a wedge collar 15 has an annular flange 15a, first and second claws 20 and 21, and a movement restricting portion. The annular flange 15a extends radially outward. The first claws 20 are integral with the flange 15a, extend through recesses 14a of the wire ring 14 to an axially inner side of a diaphragm spring 8, and is provided at its tip end with bent portions 20a for retaining the wire ring 14. The second claws 21 are formed integrally with the flange 15a for retaining the wiring 14 between the bent portions 20a and the second claws 21. The movement restricting portion is formed by the second claws 21 which have inclined configurations having tip ends pressed against the inner periphery of the lever plate 16, and thereby restricts movement of the wire ring 14 relative to the lever plate 16.

11 Claims, 6 Drawing Sheets

WIRE RING RETAINING COLLAR AND RELEASE DEVICE FOR A PULL TYPE CLUTCH MECHANISM

BACKGROUND OF THE INVENTION

A. Field of the Invention

The present invention relates to an annular ring retaining collar, and in particular, to a wire ring retaining collar for retaining a wire ring in between an inner periphery of a diaphragm spring and a release bearing in a pull type clutch mechanism. The invention also relates to a release device, and in particular, to a release device employing the wire ring retaining collar in which the release device includes a lever plate which engages the inner periphery of the diaphragm spring and the release device is configured to axially move the diaphragm spring between an clutch engagement state and a clutch disengagement state.

B. Description of the Background Art

A pull type clutch generally typically includes a release device that pulls a radially inner portion of a diaphragm spring toward a transmission to disengage the clutch.

Such a release device usually includes a release bearing which is moved by an externally operated release lever or the like, and a coupling mechanism for coupling the release bearing to a lever plate in engagement with an inner periphery of a diaphragm spring. The coupling mechanism has a locking mechanism interposed between the release bearing and the lever plate which locks the lever plate and the release bearing together.

Various release devices are disclosed in Japanese Laid-Open Utility Model Publication Nos. 4-31335 (1992), 4-84927 (1992), 4-107525 (1992) and 4-122825 (1992).

In the release devices shown in Japanese Laid-Open Utility Model Publication Nos. 4-31335 and 4-84927 disclose an annular collar that is formed with first and second sets of claws for retaining a wire ring. The claws in both the first and second sets of claws extend in an axial direction from a generally annular portion of the collar. One end of each of the claws of the first set of claws is formed with a radially extending bent portion. The second set of claws are generally straight as they extend in the axial direction. The wire ring is retained between the radially extending bent portions of the first set of claws and the ends of the second set of claws. When the collar and wire ring are installed to lock the release bearing to the lever plate, a separate annular ring member must be installed radially inward and adjacent to the annular collar in order to secure the annular collar in place. Such an arrangement requires a large number of inter-engaging parts, complicating assembly and thus increasing production costs.

In the structure disclosed in Japanese Laid-Open Utility Model Publication No. 4-107525, an annular collar is also formed with first and second sets of claws. A wire ring is engaged with an engagement portion formed at the inner periphery of the lever plate, and has a radially inner portion fitted into an engagement groove of the release bearing. Each of the first set of claws is formed with a bent portion that urges the wire ring against the engagement grooves. Each of the second set of claws is formed with a bent portions such that the lever plate is retained between the wire ring and the bent portions of the second set of claws.

In the release device of the pull type clutch, vibrations and other forces that result from rotation of the clutch mechanism, generate forces which pull the release device toward the diaphragm spring. This force may cause disengagement of the wire ring from the engagement portion of the lever plate. Further, during rotation of the clutch mechanism, the wire ring is continuously being subjected to centrifugal forces which cause it to be urged radially outward. Sometimes the wire ring becomes disengaged from the engagement portion of the lever plate, and therefore is disengages from the fitting groove of the release bearing. In this disengaged state, when an operator performs a releasing operation to move the release bearing toward the transmission, the wire ring may disengage from the release bearing causing a mechanical failure of the clutch mechanism.

SUMMARY OF THE INVENTION

Accordingly, one object of the present invention is to provide a release device of a pull type clutch with a retaining means in which disengagement of a wire ring is prevented.

Another object of the present invention is to reduce the number of parts in a retaining means in a release device of a pull type clutch.

In accordance with one aspect of the present invention, a retaining mechanism for a pull type clutch includes a wire ring formed with a plurality of circumferentially spaced apart recesses, each of the recesses have a semi-circular cross-section. The retaining mechanism also includes a wedge collar formed with an annular flange which extends radially outward. A first set of claws extend in an axial direction away from the annular flange, each one of the first set of claws extending into a corresponding one of the recesses of the wire ring. Each one of the first set of claws is further formed with a bent portion which extends in a radial direction. The wedge collar is also formed with a second set of claws which extend generally in an axial direction away from the annular flange, each one of the second set of claws being axially shorter that the first set of claws. The wire ring is disposed axially between axial ends of the second set of claws and the bent portions of the first set of claws, the second set of claws being bent slightly with respect to the axial direction.

Preferably, the wire ring is an annular ring which has been cut to form a gap in an uncompressed state.

Preferably, the retaining device also includes a lever plate configured for engagement with a radially inward portion of a diaphragm spring of a clutch mechanism. The lever plate is formed with an annular groove having a diameter smaller than an outer diameter of the wire ring. The wire ring is compressible such that the wire ring is retained in the annular groove.

Preferably, the retaining mechanism further includes a release bearing having an inner race formed with an axially extending tubular extension, the extension formed with an annular groove, the wire ring being configured for insertion into the annular groove.

Preferably, the set of first claws are disposed radially inside the diaphragm spring, and the second set of claws are configured to engage an inner surface of the lever plate.

Preferably, the retaining mechanism includes a lever plate configured for engagement with a radially inward portion of a diaphragm spring of a clutch mechanism, the lever plate being formed with a first annular groove having a diameter smaller that an outer diameter of the wire ring. A release bearing has an inner race formed with an axially extending tubular extension, the extension formed with a second annular groove. The wire ring is configured for insertion into both the first and second annular grooves and the second set of claws are configured to engage an inner surface of the lever plate.

Preferably, the annular flange in the wedge collar is formed with an annular drawn portion.

In accordance with another aspect of the present invention, a release device includes a lever plate attached to a radially inner periphery of a diaphragm spring of a pull type clutch and a release bearing. The release bearing is formed with an inner race which extends axially defining a cylindrical member which extends axially inside an inner periphery of the lever plate, an outer periphery of the cylindrical member formed with an annular fitting groove. A wire ring having an annular body is formed with a plurality of circumferentially spaced apart passing portions radially thinner than the remainder of the annular body. The wire ring is configured to fit into the fitting groove and engage an inner periphery of the lever plate. A wire ring retaining collar has an annular flange which extends radially outwardly, the flange being disposed between the release bearing and the wire ring. The retaining collar is formed with a plurality of first claws which extend axially from an inner periphery of the flange and each of the first claws extending through a corresponding one of the passing portions of the wire ring. Each of the first claws having a bent portion at its tip end extending radially outward. The retaining collar is also formed with a plurality of second claws extending from the inner periphery of the flange toward the wire ring for retaining the wire ring between the bent portion of each of the first claws and the second claws. The second claw has an inclined configuration having a tip end located radially outside its base end, and the tip end presses against a radial inner surface of the lever plate.

Preferably, a spring member is disposed between the diaphragm spring and the flange of the retaining collar for forcing the wire retaining collar toward the release bearing.

In accordance with another aspect of the present invention, a release device includes a lever plate attached to a radially inner periphery of a diaphragm spring of a pull type clutch. A release bearing has an inner race which extends axially defining a cylindrical member which extends axially inside an inner periphery of the lever plate. An outer periphery of the cylindrical member is formed with an annular fitting groove. A wire ring has an annular body formed with a plurality of circumferentially spaced apart passing portions radially thinner than the remainder of the annular body. The wire ring is configured to fit into the fitting groove and engage an inner periphery of the lever plate. A wire ring retaining collar has an annular flange which extends radially outwardly, the flange being disposed between the release bearing and the wire ring. The retaining collar is formed with a plurality of first claws which extend axially from an inner periphery of the flange and each of the first claws extends through a corresponding one of the passing portions of the wire ring. Each of the first claws has a bent portion at its tip end extending radially outward. The retaining collar is also formed with a plurality of second claws extending from the inner periphery of the flange toward the wire ring for retaining the wire ring between the bent portion of each of the first claws and the second claws. A spring member is disposed between the diaphragm spring and the flange of the retaining collar for forcing the wire retaining collar toward the release bearing.

Preferably, the second claw has an inclined configuration having a tip end located radially outside its base end, and the tip end presses against a radial inner surface of the lever plate.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
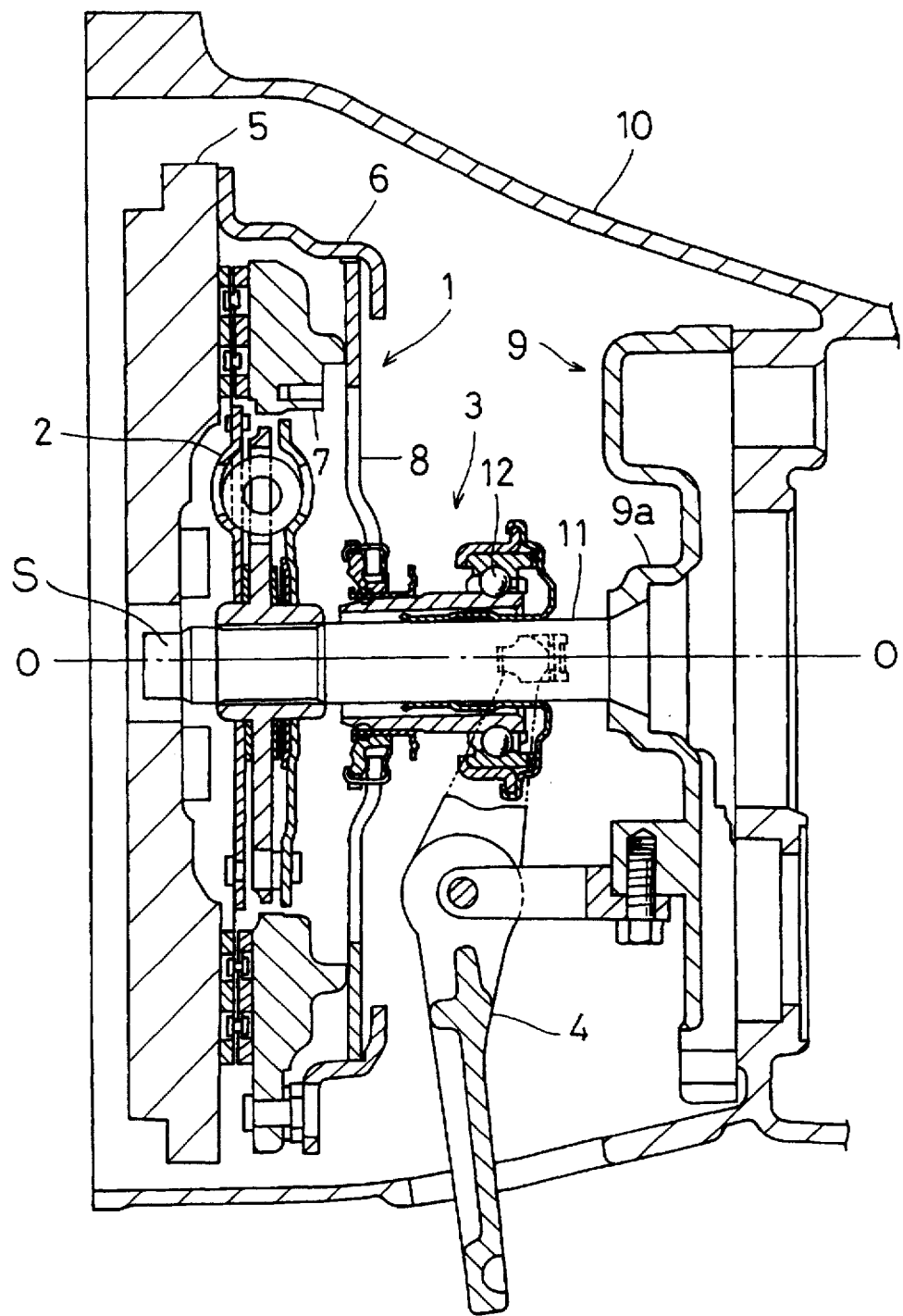
FIG. 1 is a cross section of clutch housing and a pull type clutch employing one embodiment of the present invention.

FIG. 1 shows a pull type clutch in accordance with a first embodiment of the present invention. In FIG. 1, line 0—0 represents a center line about which the clutch rotates. Although not shown, an engine is attached to a flywheel 5, the engine being disposed to the left side of FIG. 1. Hereinafter, the left side of FIG. 1 will be referred to as the engine side. A transmission (not shown) is disposed on the right side of FIG. 1. Hereinafter the right side of FIG. 1 will be referred to as the transmission side.

In FIG. 1, the pull type clutch is shown with a clutch cover assembly 1, a clutch disk assembly 2, a release device 3 and a release fork 4.

The clutch cover assembly 1 includes a clutch cover 6 fixed to a flywheel 5 on the engine side, a pressure plate 7 arranged in the clutch cover 6, and a diaphragm spring 8. The diaphragm spring 8 is supported at its outer periphery by the clutch cover 6, and has a radially middle portion pressing the pressure plate 7 toward the clutch disk assembly 2.

The clutch disk assembly 2 has a radially outer friction portion which is selectively engaged between the flywheel 5 and the pressure plate 7. The clutch disk assembly 2 is spline-fitted at its central portion onto a front end of a main shaft S of the transmission (not shown) at the transmission side.

A transmission housing 9 is arranged at the transmission side of the clutch cover assembly 1. Although not shown, a rear portion of the main shaft S extends into the transmission housing 9. The transmission housing 9 is provided at its front end with a clutch housing 10 covering the clutch cover assembly 1 and flywheel 5. In the clutch housing 10, a collar 11 is arranged at a center of a front wall 9a of the transmission housing 9. The collar 11 covers the outer periphery of rear portion of the main shaft S.

Figure 2:
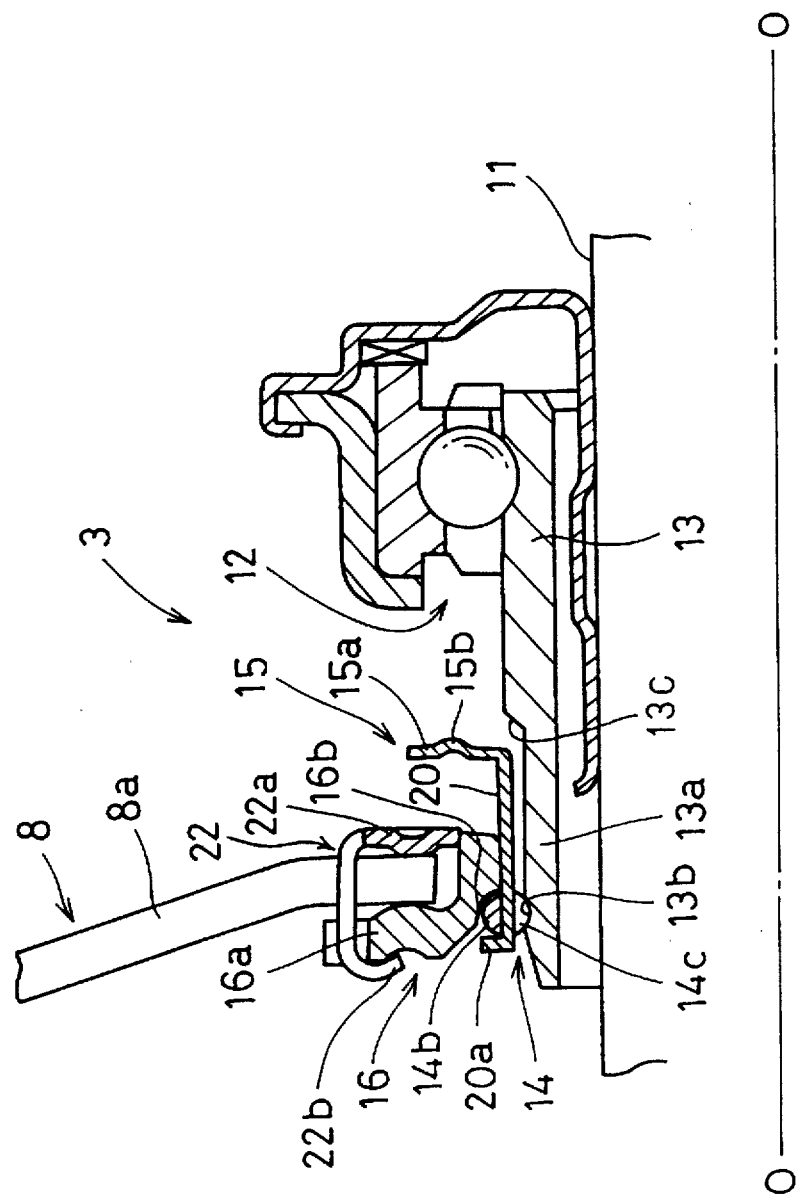
FIG. 2 is a fragmentary cross section of a portion of FIG. 1, on an enlarged scale, showing a wedge collar and a wire ring of a release device of the present invention.

As shown in FIG. 2, the release device 3 has a release bearing 12, a wire ring 14, a wedge collar 15 and a lever plate 16.

The release bearing 12 is slidably fitted around the collar 11. An inner race 13 of the release bearing 12 has an extension 13a extending axially toward the engine side. As shown in FIG. 3 on an enlarged scale, the extension 13a is provided at an outer periphery of its tip end with an annular fitting groove 13b.

Figure 3A:
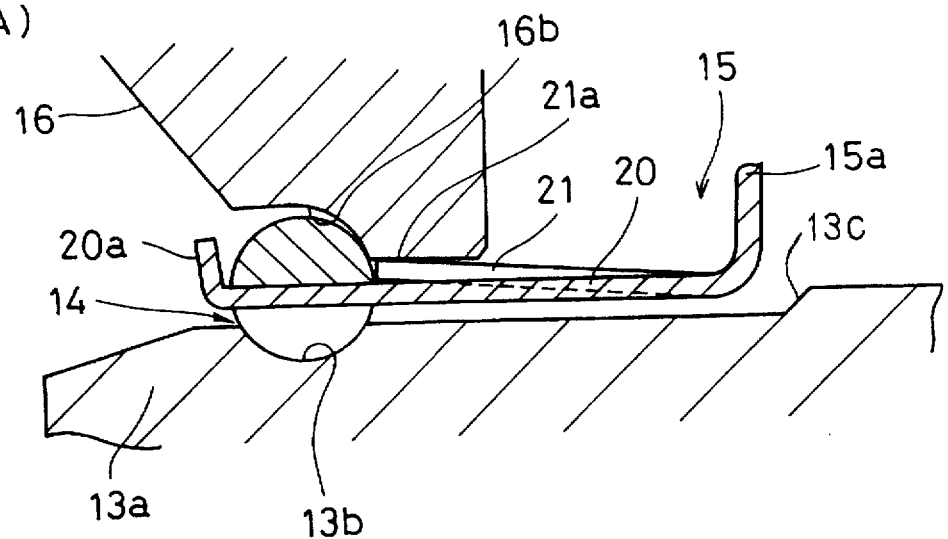
FIGS. 3(A) and 3(B) are fragmentary cross sections of the release device depicted in FIG. 2, on a further enlarged scale.
Figure 4:
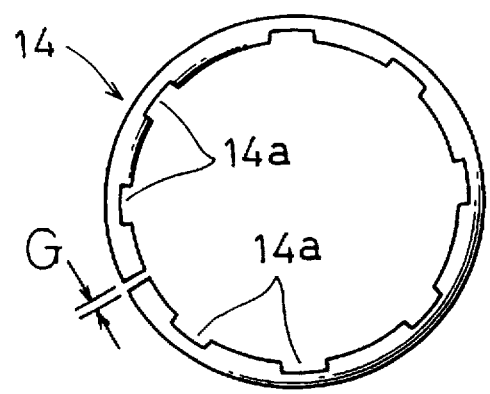
FIG. 4 is a plan of the wire ring shown in FIGS. 2, 3(A) and 3(B), shown removed from the release device.

The wire ring 14 is an annular member which has a circular section and is formed with a gap G, as shown in FIG. 4. The wire ring 14 is provided at its inner periphery with a plurality of recesses 14a which are circumferentially equally spaced from each other. Thus, the wire ring 14 has a plurality of passing portions (i.e., recesses 14a) which in a radial direction, are thinner than the other portions and are circumferentially equally spaced from each other. In cross section, each recess 14a has a half-circular shape, as shown in FIG. 3(A). The radially inner portion of the wire ring 14 is fitted into the fitting groove 13b at the tip end of the inner race 13. In a free state (i.e., before fitting to the release device 3), the wire ring 14 has an inner diameter larger than an outer diameter of the fitting groove 13b.

Figure 5:
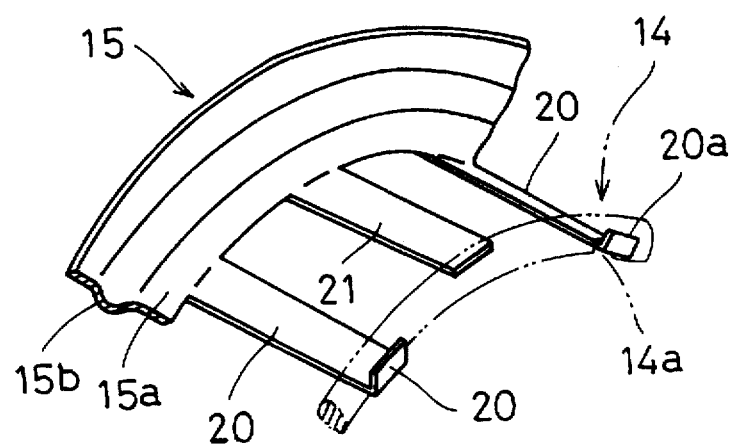
FIG. 5 is a fragmentary perspective view of the wedge collar depicted in FIGS. 2, 3(A) and 3(B), shown removed from the release device with the wire ring shown in phantom.

As shown in FIG. 5, the wedge collar 15 has an annular flange 15a extending radially outward as well as a plurality of first and second claws 20 and 21 which protrude axially from the flange 15a. The first claws 20 are circumferentially spaced from each other by the substantially same distance as that between the recesses 14a of the wire ring 14 so as to allow insertion thereof into the recesses 14a. This first claws 20 hold the wire ring 14 concentrically with the wedge collar 15. Each first claw 20 is provided at its tip end with a bent portion 20a which is bent radially outward. Each second claw 21 is formed between the adjacent first claws 20, and is in contact with an axially rear portion (the transmission side) of a portion of the wire ring 14 at a position that does not correspond with the recesses 14a. The wire ring 14 is axially retained between the bent portions 20a of the first claws 20 and the tip ends of the second claws 21.

The flange 15a of the wedge collar 15 has an annular drawn portion 15b, which extends circumferentially and protrudes toward the release bearing 12. This drawn portion 15b improves the stiffness of the flange 15a.

The lever plate 16 is attached to the radially inner end of the diaphragm spring 8 by a support plate 22, as shown in FIG. 2. The lever plate 16 is provided at its axially front portion with a radially outward flange 16a. The support plate 22 has an annular body 22a and an engagement portion 22b axially protruding from the annular body 22a. The engagement portion 22b is engaged with the flange 16a of the lever plate 16. In this manner, the radially inner end 8a of the diaphragm spring 8 is held between the flange 16a of the lever plate 16 and the annular body 22a of the support plate 22, so that the lever plate 16 is coupled to the radially inner end 8a of the diaphragm spring 8. The lever plate 16 is provided at its radially inner end with an annular groove 16b opened axially toward the engine side. The radially outer portion of the wire ring 14 is fitted axially into the annular groove 16b.

An outer diameter of the wire ring 14 in a free state is larger than an inner diameter of the annular groove 16b. It should be appreciated, that upon installation into the grooves 13b and 16b, the wire ring 14 is slightly compressed such that its outer diameter is slightly reduced due to being fitted into the smaller diameter of the groove 16b. The wire ring 14 may be compressed in this manner due to the gap G formed therein.

Owing to the above structure, the radially inner end 8a of the diaphragm spring 8 is coupled to the extension 13a of the inner race 13 via the lever plate 16 and the wire ring 14.

The structure which prevents the release device 3 from moving toward the flywheel 5 will be described below.

Figure 3B:
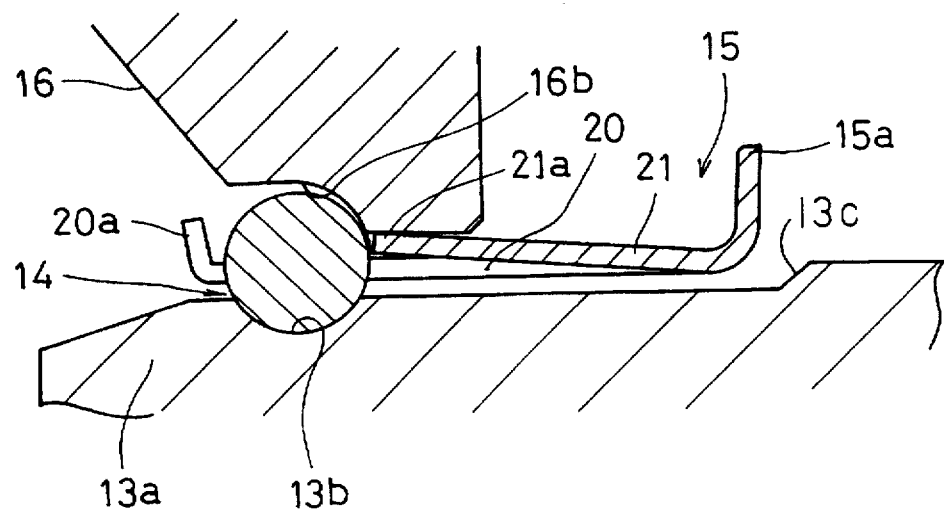

As shown on an enlarged scale in FIG. 3(B), the second claw 21 of the wedge collar 15 is inclined with respect to the axial direction (line 0—0 in FIG. 1) and has a tip end 21a located radially outside a portion near the flange 15a (base end). In this structure, an outer diameter of the tip ends 21a of the second claws 21 in the free state is larger than an inner diameter of the lever plate 16. Therefore, once the wedge collar 15 is attached to the release device 3 and the second claws 21 are installed axially within the lever plate 16, the tip ends 21a press against the inner periphery of the lever plate 16. Accordingly, a frictional force is present between the lever plate 16 and the tip ends 21a when an axial force is applied to the release device 3.

When the clutch is engaged, the structure described above is in the state shown in FIG. 1. In this state, the release device 3 rotates together with the clutch cover assembly 1 and the clutch disk assembly 2. The rotation of the clutch, vibrations and centrifugal forces all act on the release device 3 urging it toward the clutch disk assembly 2. In the configuration of the present invention however, the tip ends 21a of the second claws 21 of the wedge collar 15 are pressed against the inner periphery of the lever plate 16 creating a frictional force therebetween. Therefore, axial movement of the release device 3 is restricted.

A description will now be given of the releasing or clutch disengagement operation of the embodiment described above.

By operating a clutch pedal (not shown), the end of the release fork 4 moves toward the transmission housing 9. Thereby, the release bearing 12 moves axially rearward toward the transmission side. Also, the extension 13a of the inner race 13 moves the radially inner end 8a of the diaphragm spring 8 axially rearward via the wire ring 14 and lever plate 16. As a result, a pressing force against the pressure plate 7 by the diaphragm spring 8 is released. Therefore, the pressure plate 7 moves rearward to disengage the clutch 2.

In this operation, the release bearing 12 moves axially rearward toward the transmission side and applies an axially rearward force to the wire ring 14. The wire ring 14 is engaged between the fitting groove 13b on the extension 13a and the annular groove 16b on the lever plate 16. The extension 13a and the lever plate 16 are coupled together via the portions of the wire ring 14 having a large strength. Meanwhile, the wedge collar 15 receives little of the forces exerted upon the wire ring 14 since the engagement between the wire ring 14 and the grooves 13b and 16b insures that the wire ring 14 transmits all engagement and disengagement forces between the lever plate 16 and the release bearing 12. Therefore, possible breakage of the wedge collar 15 is minimal, and expensive machining accuracy is not required for the manufacture of the wedge collar 15.

Description will now be given on assembly and disassembly of the release device 3.

As is shown in FIG. 2, when fully assembled, the flange 15a of the wedge collar 15 is spaced apart from the lever plate 16. Further, the inner race 13 of the release bearing 12 is formed with a stepped portion 13c.

Figure 6A:
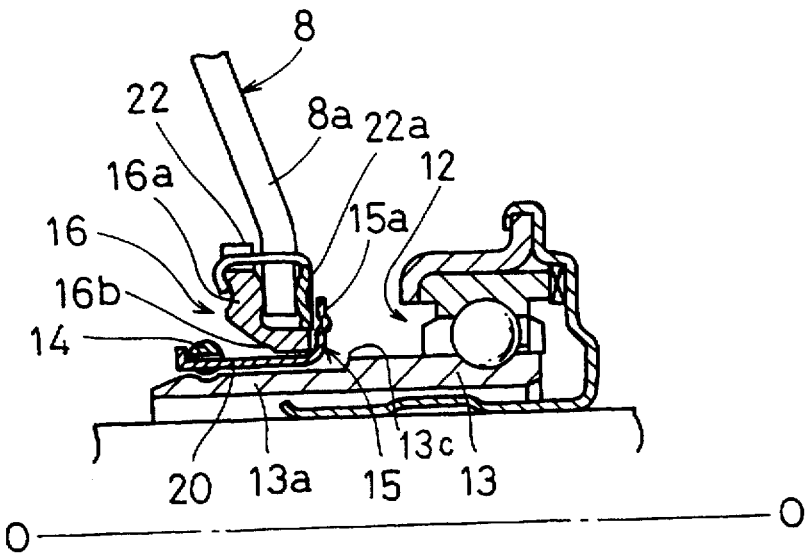
FIGS. 6(A) and 6(B) are fragmentary cross sections of the release device, similar to FIG. 2, showing disassembly of the release device.

For disassembly, the tip end of the release fork 4 is moved axially forward toward the engine side thus moving axially forward the release bearing 12 with respect to the diaphragm spring 8. As a result, the stepped portion 13c engages the wedge collar 15 moving the wedge collar together with the release bearing 12 toward the engine side. As shown in FIG. 6(A), the wire ring 14 is disengaged from the annular groove 16b of the lever plate 16. At this time, the diameter of the wire ring 14. which had previously been forcedly reduced by fitting into the annular groove 16b of the lever plate 16. is again allowed to increases upon disengagement with the annular groove 16b of the lever plate 16. In this disengaged state, the inner diameter of the wire ring 14 is larger than the outer diameter of the fitting groove 13b of the release bearing 12. It should be noted that the wire ring 14 does not drop from the wedge collar 15, because the first and second claws 20 and 21 of the wedge collar 15 axially retain the wire ring 14.

Figure 6B:
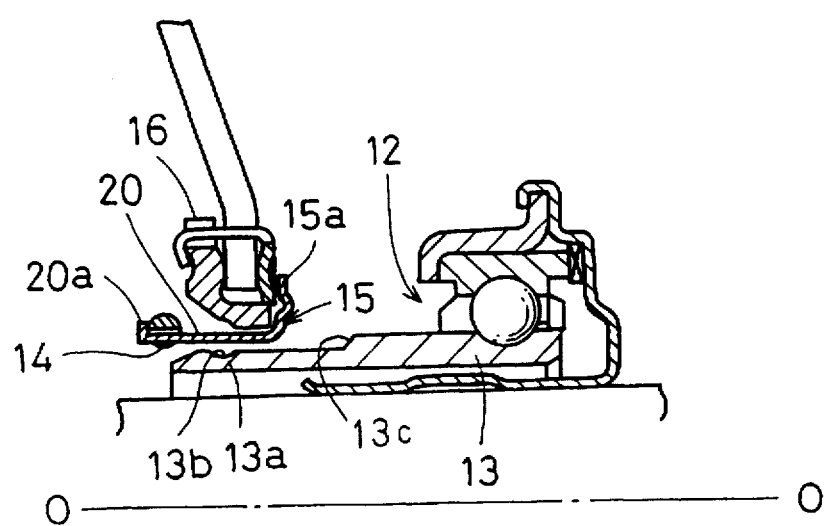

In the above state, the release bearing 12 may be axially moved toward the transmission side and removed from the wedge collar 15, as shown in FIG. 6(B). The removal from the wedge collar 15 is usually is performed when removing the transmission from the engine. During removal, the wire ring 14 is completely disengaged from the fitting groove 13b, and the inner race 13 is disengaged axially from the wire ring 14 by movement toward the transmission side. Disassembly of the wedge collar 15 and the wire ring 14 can be easily performed by disengaging the first claws 20 of the wedge collar 15 from the recesses 14a of the wire ring 14.

For assembly, the release bearing 12 in the state shown in FIG. 6(B) is moved axially toward the engine side. The wedge collar 15 is moved axially together with the release bearing 12 toward the transmission side. Thereby, the wire ring 14 is fitted into the annular groove 16b of the lever plate 16, and is also fitted into the fitting groove 13b of the release bearing 12, so that the coupling is completed.

Figure 7:
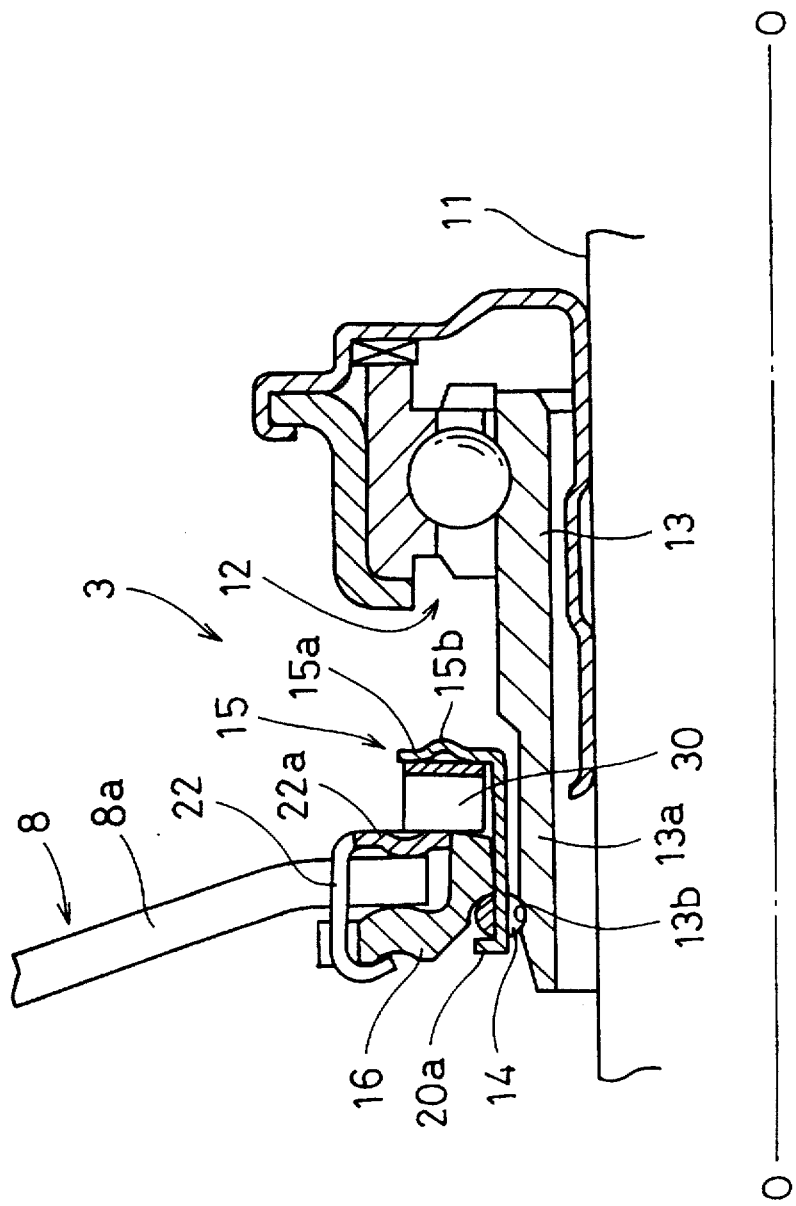
FIG. 7 is a fragmentary cross section, similar to FIG. 2, showing an alternate embodiment of the release device.

An alternate embodiment of the present invention is shown in FIG. 7. The alternate embodiment in FIG. 7 generally includes all of the elements of the embodiment described above but has additional structure.

In the alternate embodiment, a wavy spring 30 is interposed between the annular body 22a of the support plate 22 and the flange 15a of the wedge collar 15. The wavy spring 30 continuously forces the wedge collar 15 rearward. Therefore, the wire ring 14 is continuously urged against the annular groove 16b of the lever plate 16, so that the release device 3, which receives a force toward the flywheel 5 during rotation, is suppressed from moving toward the flywheel 5.

The structure of the movement restricting portion is not restricted to the above embodiments, and it may employ various structures provided that the release device 3 including the wire ring 14 is restricted from moving axially with respect to the lever plate 16.

According to the invention, as described above, the release device 3 including the wire ring is restricted from moving axially forward with respect to the lever plate. Therefore, it is possible to prevent the wire ring from coming out of the groove 16b during the release operation of the clutch.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A retaining mechanism for a pull type clutch, comprising:
    a wire ring formed with a plurality of circumferentially spaced apart recesses, each of said recesses have a semi-circular cross-section;
    a wedge collar formed with an annular flange which extends radially outward, a first set of claws which extend in an axial direction away from said annular flange, each one of said first set of claws extending into a corresponding one of said recesses of said wire ring, each one of said first set of claws further formed with a bent portion which extends in a radial direction, said wedge collar further formed with a second set of claws which extend generally in an axial direction away from said annular flange, each one of said second set of claws being axially shorter that said first set of claws, said wire ring being disposed axially between axial ends of said second set of claws and said bent portions of said first set of claws, said second set of claws being bent slightly with respect to the axial direction.

2. The retaining mechanism as in claim 1 wherein said wire ring is an annular ring which has been cut to form a gap in an uncompressed state.

3. The retaining mechanism as in claim 2, further comprising:
    a lever plate configured for engagement with a radially inward portion of a diaphragm spring of a clutch mechanism, said lever plate being formed with an annular groove having a diameter smaller than an outer diameter of said wire ring, said wire ring being compressible such that said wire ring is retained in said annular groove.

4. The retaining mechanism as in claim 2, further comprising a release bearing having an inner race formed with an axially extending tubular extension, said extension formed with an annular groove, said wire ring being configured for insertion into said annular groove.

5. The retaining mechanism as in claim 3, wherein said set of first claws are disposed radially inside said diaphragm spring, and said second set of claws are configured to engage an inner surface of said lever plate.

6. The retaining mechanism as in claim 2, further comprising:
    a lever plate configured for engagement with a radially inward portion of a diaphragm spring of a clutch mechanism, said lever plate being formed with a first annular groove having a diameter smaller that an outer diameter of said wire ring;
    a release bearing having an inner race formed with an axially extending tubular extension, said extension formed with a second annular groove; and
    wherein said wire ring is configured for insertion into both said first and second annular grooves and said second set of claws are configured to engage an inner surface of said lever plate.

7. The retaining mechanism as in claim 1 wherein said annular flange in said wedge collar is formed with an annular drawn portion.

8. A release device comprising:
    a lever plate attached to a radially inner periphery of a diaphragm spring of a pull type clutch;
    a release bearing having an inner race which extends axially defining a cylindrical member which extends axially inside an inner periphery of said lever plate, an outer periphery of said cylindrical member formed with an annular fitting groove;
    a wire ring having an annular body formed with a plurality of circumferentially spaced apart passing portions radially thinner than the remainder of said annular body, said wire ring being configured to fit into said fitting groove and engage an inner periphery of said lever plate;
    a wire ring retaining collar having an annular flange which extends radially outwardly, said flange being disposed between said release bearing and said wire ring, said retaining collar being formed with a plurality of first claws which extend axially from an inner periphery of said flange and each of said first claws extending through a corresponding one of said passing portions of said wire ring, each of said first claws having a bent portion at its tip end extending radially outward, said retaining collar also formed with a plurality of second claws extending from the inner periphery of said flange toward said wire ring for retaining said wire ring between said bent portion of each of said first claws and said second claws, and wherein said second claw has an inclined configuration having a tip end located radially outside its base end, and said tip end presses against a radial inner surface of said lever plate.

9. The release device according to claim 8, further comprising a spring member disposed between said diaphragm spring and said flange of said retaining collar for forcing said wire retaining collar toward said release bearing.

10. A release device comprising:

a lever plate attached to a radially inner periphery of a diaphragm spring of a pull type clutch;

a release bearing having an inner race which extends axially defining a cylindrical member which extends axially inside an inner periphery of said lever plate, an outer periphery of said cylindrical member formed with an annular fitting groove;

a wire ring having an annular body formed with a plurality of circumferentially spaced apart passing portions radially thinner than the remainder of said annular body, said wire ring being configured to fit into said fitting groove and engage an inner periphery of said lever plate;

a wire ring retaining collar having an annular flange which extends radially outwardly, said flange being disposed between said release bearing and said wire ring, said retaining collar being formed with a plurality of first claws which extend axially from an inner periphery of said flange and each of said first claws extending through a corresponding one of said passing portions of said wire ring, each of said first claws having a bent portion at its tip end extending radially outward, said retaining collar also formed with a plurality of second claws extending from the inner periphery of said flange toward said wire ring for retaining said wire ring between said bent portion of each of said first claws and said second claws; and a spring member disposed between said diaphragm spring and said flange of said retaining collar for forcing said wire retaining collar toward said release bearing.

11. The release device according to claim 10, wherein said second claw has an inclined configuration having a tip end located radially outside its base end, and said tip end presses against a radial inner surface of said lever plate.

* * * * *